Sept. 25, 1956

B. L. FOWLER 2,764,076

REVERSIBLE PLOW

Filed Oct. 20, 1953

5 Sheets-Sheet 1

INVENTOR
BYRON L. FOWLER

BY

ATTORNEY

Sept. 25, 1956

B. L. FOWLER 2,764,076

REVERSIBLE PLOW

Filed Oct. 20, 1953

5 Sheets-Sheet 2

INVENTOR
BYRON L. FOWLER
BY
ATTORNEY

Sept. 25, 1956
B. L. FOWLER
2,764,076
REVERSIBLE PLOW
Filed Oct. 20, 1953
5 Sheets-Sheet 3
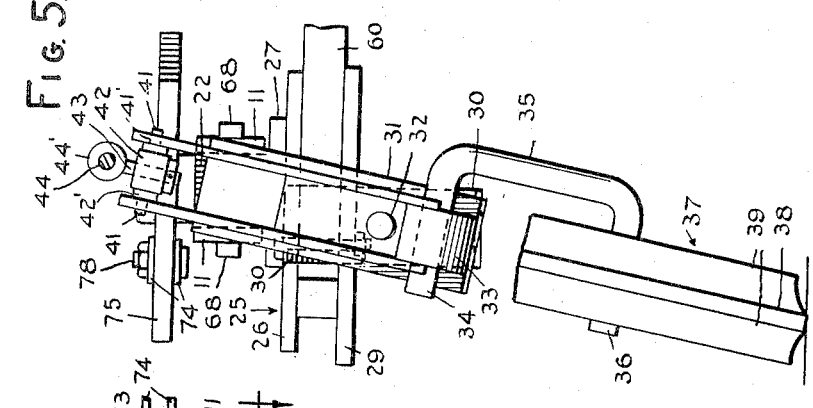
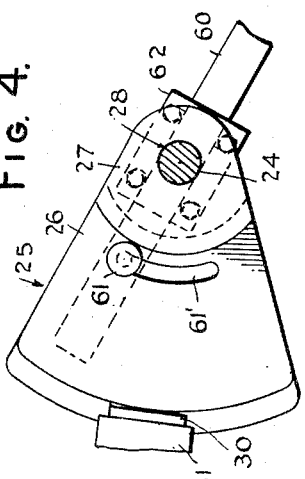
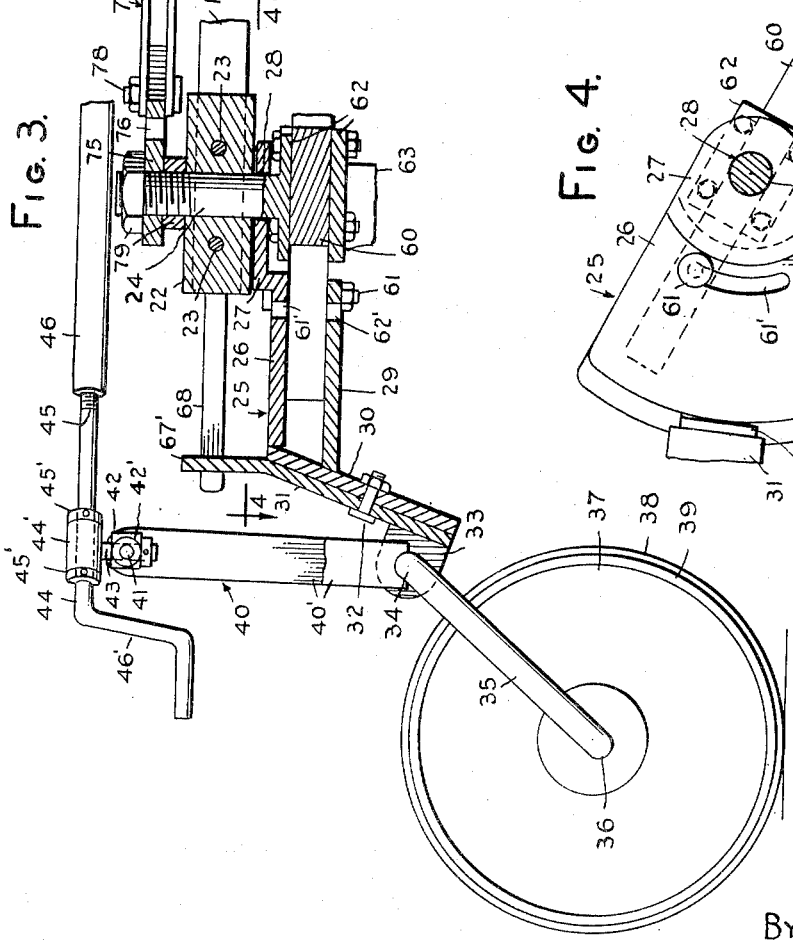
INVENTOR
BYRON L. FOWLER
BY
ATTORNEY

INVENTOR
BYRON L. FOWLER
BY
ATTORNEY

Sept. 25, 1956

B. L. FOWLER 2,764,076

REVERSIBLE PLOW

Filed Oct. 20, 1953

5 Sheets—Sheet 5

INVENTOR
BYRON L. FOWLER

BY  *signature*

ATTORNEY

United States Patent Office 2,764,076
Patented Sept. 25, 1956

2,764,076

REVERSIBLE PLOW

Byron L. Fowler, Corpus Christi, Tex., assignor to E. L. Caldwell & Sons, Corpus Christi, Tex., a firm Application October 20, 1953, Serial No. 387,160

8 Claims. (Cl. 97—32)

My invention relates to reversible plows.

An important object of the invention is to provide power-operated means which raises the plow disks or blades out of contact with the ground and then shifts them laterally, so that the plow disks will throw the soil in the same direction with respect to the ground when the plow is travelling in opposite directions.

A further object of the invention is to provide a plow of the above mentioned character supported by forward and rear wheels and having a draft appliance for steering the forward wheels.

A further object of the invention is to provide means operated by a travelling element to first raise the ground engaging elements out of contact with the ground and then shift the same laterally.

Figure 1:
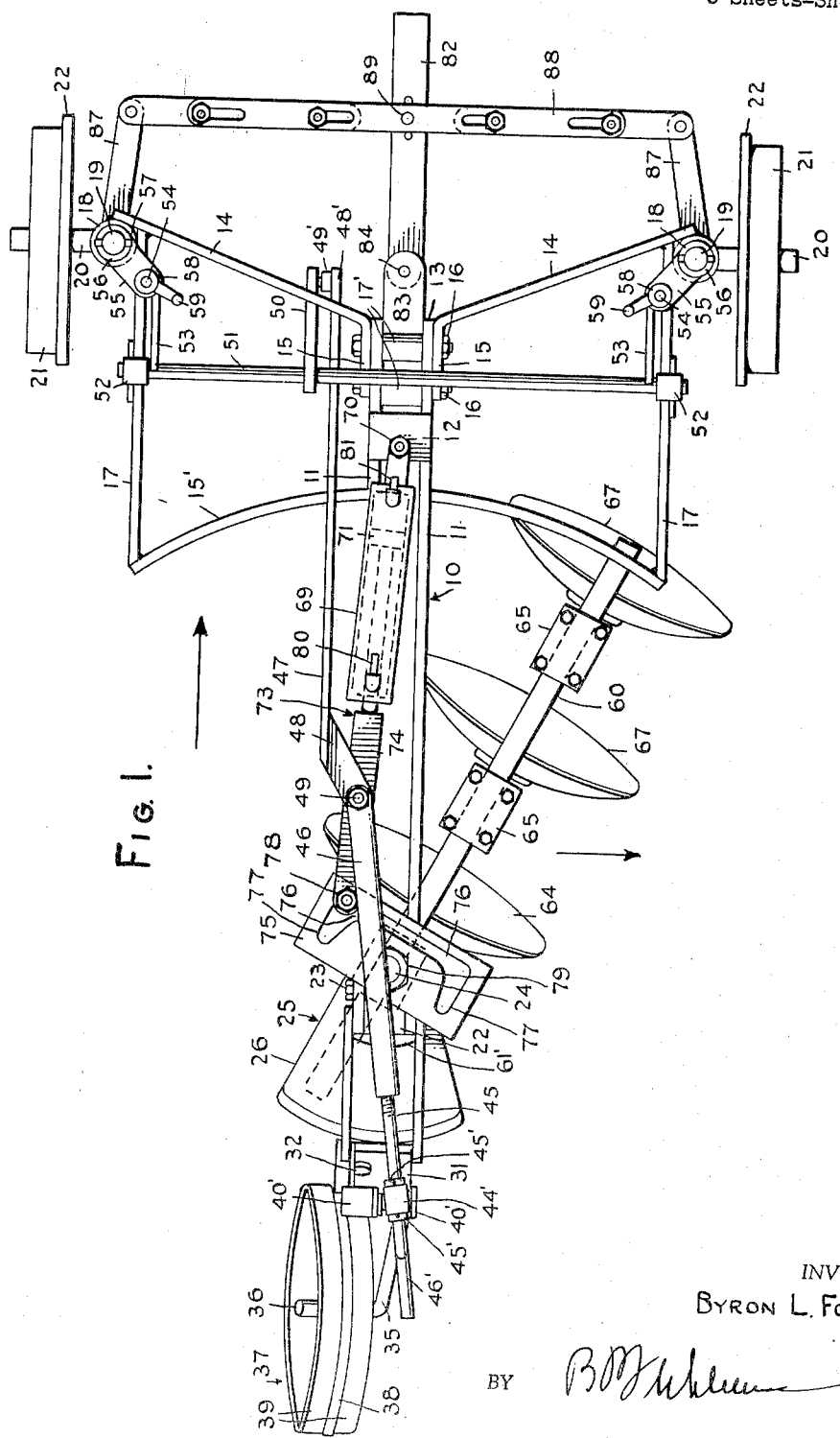
Figure 2:
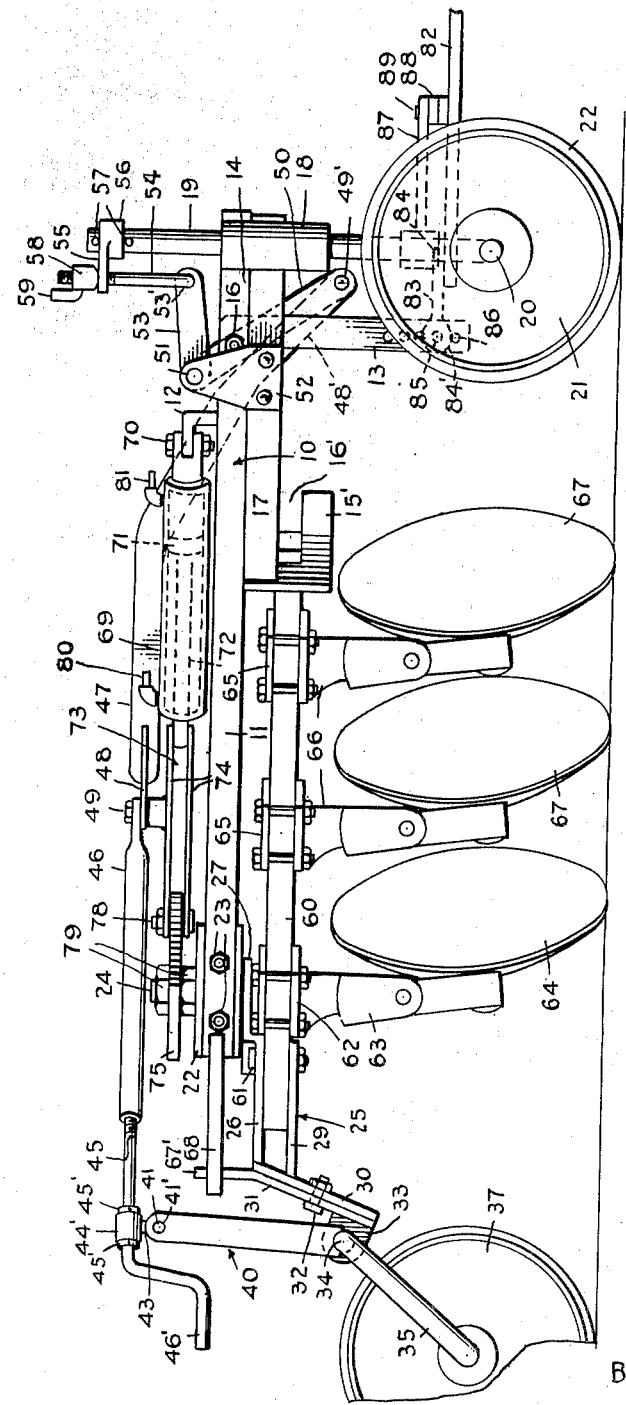

Other objects and advantages of the invention will be apparent during the course of the following description:

In the accompanying drawings forming a part of this application and in which like numerals are employed to designate like parts throughout the same, Figure 1 is a plan view of a reversible plow embodying my invention, Figure 2 is a side elevation of the same, Figure 3 is a side elevation of the rear wheel and associated elements, parts being shown in vertical section, Figure 4 is a horizontal section taken on line 4—4 of Figure 3, Figure 5 is a rear elevation of the rear wheel and the swinging crank, and associated elements, parts omitted, Figures 6, 8, 10, 12, 14, 16, 18 and 20 are diagrammatic plan views illustrating the operation of the plow, and, Figures 7, 9, 11, 13, 15, 17, 19 and 21 are diagrammatic side elevations of the plow illustrating its operation.

In the drawings, the numeral 10 designates a main horizontal frame, including frame bars 11. These frame bars are rigidly connected near their forward ends by an angle iron 12. The forward ends of the frame bars 11 carry depending vertical extensions 13, rigidly secured thereto. Arranged at the forward end of the main frame 10 are transverse frame bars 14, which are horizontal, and diverge forwardly. The frame bars 14 have longitudinal extensions 15 rigidly secured thereto, and these extensions 15 are disposed upon the outer sides of the frame bars 11 and are clamped thereto by bolts 16, passing through spacing sleeves 17'.

The numeral 15' designates a guide rail arranged beneath and extending transversely of the frame bars 11, and rigidly secured to the frame bars 11 by welding or the like. The guide rail 15' is longitudinally curved and has a slot 16'. The outer ends of the guide rail 15' are rigidly secured to longitudinal bars 17, which extend forwardly and are attached near and adjacent to the ends of the bars 14.

Disposed rearwardly of and adjacent to the outer ends of the bars 14 are vertical bearing sleeves 18, which are rigidly secured to the bars 14 and bars 17 by welding.

These bearing sleeves 18 receive vertical posts 19, to turn therein, and these posts are provided at their lower ends with axles 20, rotatably holding steering wheels 21, having single flanges 22. It is thus seen that the main frame 10, rail 15', bars 17 and bars 14 form a supporting frame, having its forward end supported from the posts 19, as will be described.

Arranged between the rear ends of the frame bars 11 is a bearing block 22 rigidly secured thereto by bolts 23 or the like. This bearing block has a vertical opening formed therein for receiving a vertical shaft or pin 24, which is free to turn therein. The numeral 25 designates a rear supporting device, comprising an upper segmental plate 26, having an upwardly off-set horizontal extension 27 having an opening 28 to pivotally receive the vertical shaft 24. Arranged below the upper plate 26 is a lower plate 29, and this plate 29 terminates short of the vertical shaft 24. The plates 26 and 29 have their rear ends rigidly connected by a vertically inclined plate 30, secured thereto by welding or the like. Arranged upon the rear face of the plate 30 is a tilt-plate 31, pivotally connected with the plate 30 by means of a pin 32. This tilt-plate 31 has a bearing block 33 rigidly mounted thereon and this bearing block pivotally receives the upper horizontal extension 34 of a vertically swinging inclined post 35, provided with a lower horizontal axle 36, carrying a tail wheel 37, having a single flange 38 and double webs 39.

An upstanding crank 40 is provided, including spaced bars 40', which have their lower ends rigidly secured to the horizontal extension 34, Figure 5. The upper ends of the bars 40' extend above the plate 31 and have openings 41' formed therein to pivotally receive trunnions 41 rigidly secured to flat extensions 42', formed integrally with a vertical sleeve 42. This vertical sleeve 42 pivotally receives a vertical shaft or pin 43, rigidly secured to a horizontal sleeve 44'. This horizontal sleeve rotatably receives a horizontal shaft 44, held against longitudinal movement within the sleeve 44' by rings 45', clamped thereon. The shaft 44 is free to rotate within the horizontal sleeve 44' but cannot move longitudinally therein. The shaft 44 is provided at its rear end with a crank 46', for turning the same. The forward end of the shaft 44 is screw-threaded, at 45, to engage within a screw-threaded connecting tubular link 46. The shaft 44 and tubular link 46 constitute an extensible connecting means. Arranged in advance of the tubular connecting link 46 is a rigid connecting link 47, arranged vertically on edge and the link 47 is provided at its rear end with a horizontal strip or web 48, rigidly secured thereto. This web is rigid. The tubular link 46 and web or extension 48 are pivotally connected by a vertical pin or pivot 49, to swing horizontally, and there is sufficient slope in this pivotal connection to permit of slight vertical swinging movements of these parts so that they will not bind in action. The link 47 has a downwardly inclined forward portion 48', the forward end of which is pivotally connected at 49' with a depending crank 50, which is rigidly secured to a transverse rock-shaft 51, arranged forwardly of the guide rail 15' and pivotally mounted in bearings 52, which are rigidly mounted upon the frame bars 17. The pivotal connection 49' is a universal connection permitting relative vertical and horizontal swinging movement between link 47 and the crank 50. The rock-shaft 51 carries forwardly extending cranks 53, rigidly secured thereto, and these cranks have their forward ends pivotally connected with link-rods 54, at 53', and these link-rods are slidably mounted within openings formed in extensions 55, integral with sleeves 56. The posts 19 are rotatable within the sleeves 56 but cannot move longitudinally within these sleeves since the posts are provided with upper and lower stop elements 57, rigidly secured thereto. The upper ends of the link-rods 54 are screw-threaded for receiving nuts 58, turned by handles 59.

Arranged beneath the frame bars 11 is a horizontal tool bar or beam 60, the rear end of which is arranged between the plates 26 and 29. The tool bar or beam 60 carries a bolt or pin 61, Figure 4, and this bolt is slidably mounted within identical elongated segmental slots 61' and 62', formed in plates 26 and 29, and these slots are concentric with the vertical shaft 24. The bolt 61 moves longitudinally within the slots 61' and 62' when the tool beam or bar 60 is swinging laterally. The extension 27 has an opening to pivotally receive the vertical shaft 24, as stated, and the tool bar or beam 60 is rigidly secured to the lower end of the vertical shaft 24 by means of a two-part clamp 62, which is rigidly secured to the vertical shaft 24 and rigidly mounted upon the tool bar or beam 60. The clamp 62 has a stock 63 rigidly mounted thereon and this stock carries a rotatable disk plow 64. Clamps 65 are rigidly mounted upon the tool bar or beam 60 and carries stocks 66, carrying plow disks 67.

The tilt plate 31 is provided at its upper end with an extension 67', arranged between a pair of rigid arms 68, rigidly mounted upon the frame bars 11.

The numeral 69 designates a horizontal cylinder the forward end of which is pivotally mounted upon the angle iron 12, as shown at 70 to swing horizontally. A piston 71 is mounted to reciprocate within the cylinder 69 and is connected with a piston rod 72 rigidly secured to a cross-head or yoke 73, embodying upper and lower bars 74, arranged upon opposite sides of a shifting plate 75. The bolt 49 is rigidly secured to the upper bar 74. This shifting plate has a main slot 76 and end slots 77. The bars 74 have their rear ends connected by a pivot element 78, operating within the slots 76 and 77. The shifting plate 75 extends transversely of the tool bar 60, and is disposed at a right angle to the same and the shifting plate has an opening formed therein to receive the vertical shaft 24, and the vertical shaft 24 has the plate 75 rigidly mounted thereon by means of nuts 79. Fluid pressure is introduced into and exhausted from the rear end of the cylinder 69 through a pipe 80, and a pipe 81 is connected with the forward end of the cylinder 69 for the same purpose. The rear ends of slots 77 comprise engaging parts for coaction with shifting means 78 mounted on rigid member 74 to move tool bar 60 from one position to another. The forward side of slot 76 comprises a face normally inclined to the longitudinal direction of motion of rigid member 74 so as to shift pin 78 from one end of plate 75 to the other when the pin is operated in a forward direction preparatory to a movement in a slot 77 for shifting the tool bar.

The forward end of the tool bar 60 is guided within the slot 16' of the rail 15'. The rail 15' is secured to the bars 17, as explained.

The numeral 82 designates a tongue included in a draft appliance. This tongue is pivotally secured to a link 83, as shown at 84 to swing horizontally with respect to the link. The link 83 has a head 84' at its rear end, arranged between the vertical extensions 13 and pivoted thereto at 85, to swing vertically with relation to the extensions 13. The pivot 85 is vertically adjustable by insertion within selected openings 86. The front wheels 21 are turned for steering the machine by means of cranks 87, rigidly secured to the posts 19 and these cranks have pivotal connections with a link 88, pivoted to the tongue 82 at 89. When the tongue 82 is swung laterally, the posts 19 are turned upon their axes to steer the wheels 21.

Figure 6:
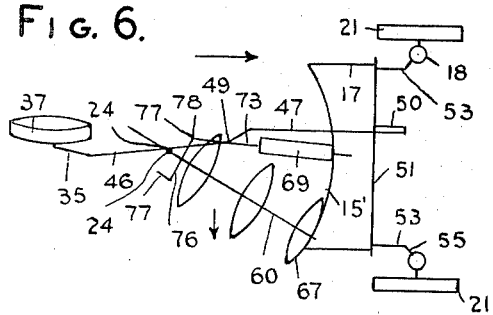
Figure 10:
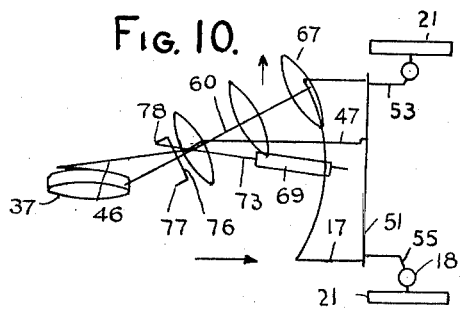
Figure 7:
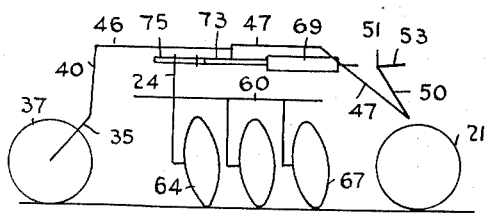
Figure 11:
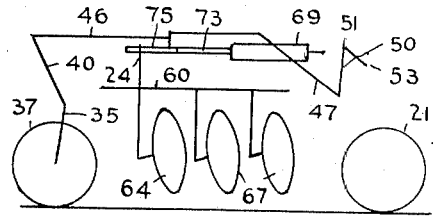
Figure 8:
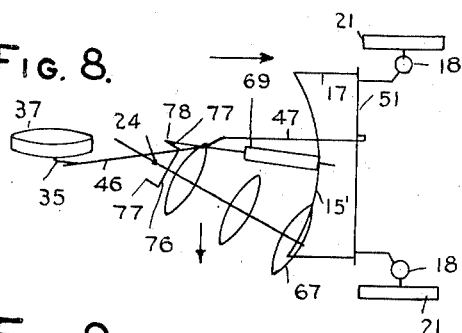
Figure 12:
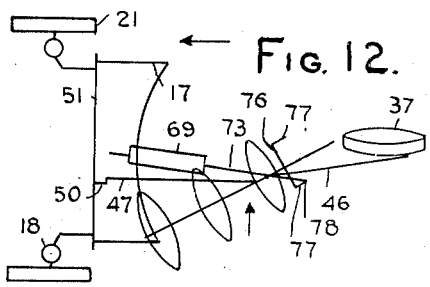
Figure 9:
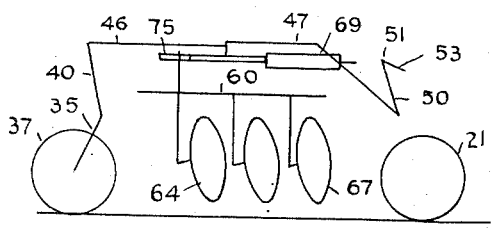
Figure 13:
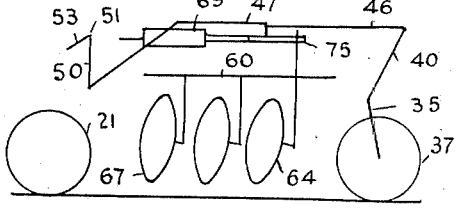
Figure 14:
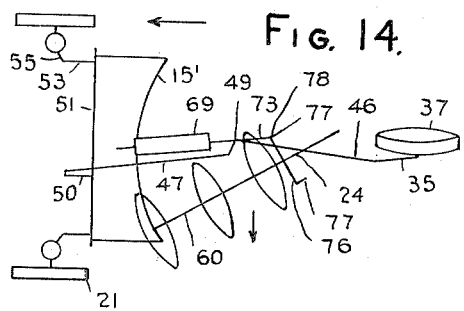
Figure 18:
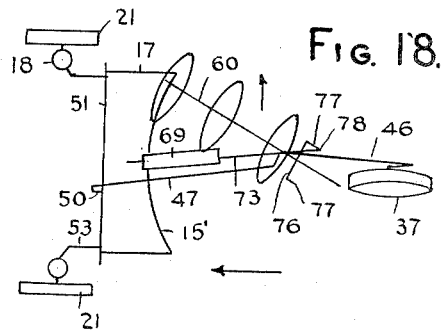
Figure 15:
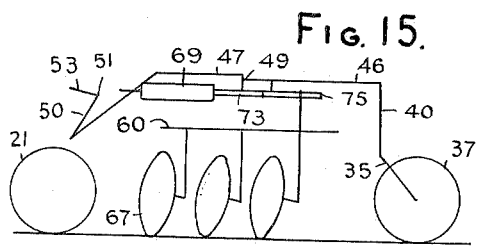
Figure 19:
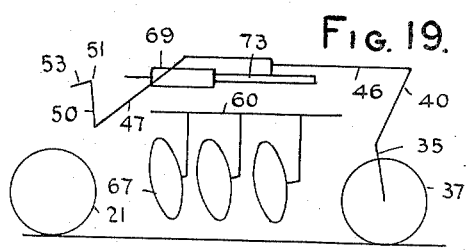
Figure 16:
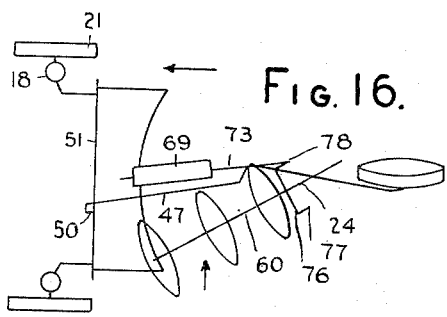
Figure 20:
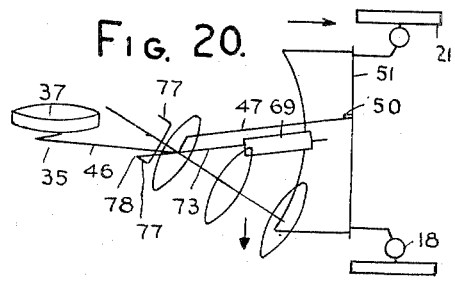
Figure 17:
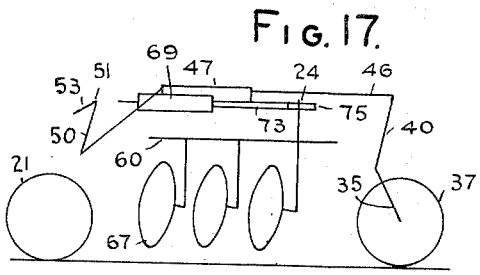
Figure 21:
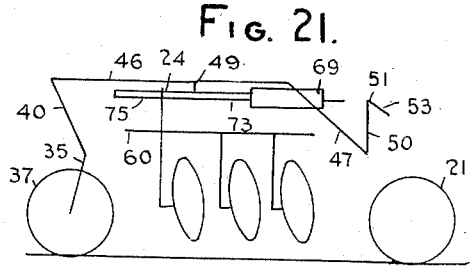

The operation of the plow is as follows:

In Figures 1, 6 and 7, the implement bar 60 has been turned clock-wise, Figure 1, and the plow is travelling forwardly to the right, as indicated by the arrow. The fluid pressure has been exhausted from the forward end of the cylinder 69 and is introduced into the rear end of the cylinder behind the piston 71 and held within the cylinder. The piston 71 is now in the forward position and the pivot element 78 is now at the forward end of the adjacent transverse slot 77. The tubular connecting link 46 and associated elements have swung the crank 40 forwardly, Figures 2 and 7, whereby the rear end of the frame 10 has been lowered. The link 47 has been moved forwardly and the rock-shaft 51 turned so that the links 53 swing upon their pivots 53' to lower their rear ends, so that the forward end of the frame 10 is also lowered. This lowers the several plow disks which engage within the ground and the furrows are turned in the direction of the arrow, Figures 1 and 6, as the plow travels forwardly to the right, as indicated by the arrows in Figures 1 and 6. When the end of the row is reached, the fluid pressure is exhausted from the rear end of the cylinder 69 and introduced into the forward end of the cylinder, and the piston 71 is shifted rearwardly for a part of its stroke, which will cause the pivot element 78 to travel in the end slot 77 to the rear end of this end slot, Figure 8, without turning the plate 75 upon its pivot, Figure 8. When the piston 71 is thus moved rearwardly, the tubular connecting link 46 and associated elements swing the crank 40 rearwardly, Figures 8 and 9, so that the rear end of the frame 10 is raised and the connecting link 47 swings the crank 50 rearwardly, turning the rock-shaft 51 clock-wise, so that the links 53 swing upon their pivots 53' to raise the forward end of the frame 10. The forward and rear ends of the frame are thus elevated and the plow disks are positioned above the ground. Additional fluid pressure is now fed into the forward end of the cylinder 69 and the piston 71 moves the pivot element 78 rearwardly until it engages the rear end of the transverse slot 77, with the result that the plate 75 and tool bar 60 are swung counterclock-wise, Figures 10 and 11. The plow disks being now out of engagement with the ground, the entire machine is turned around and will be facing in the opposite direction to travel to the left, Figures 12 and 13. The fluid pressure is now exhausted from the forward end of the cylinder 69 and introduced into the rear end of this cylinder and the piston 71 moves forwardly, and the pivot element 78 travels from the rear end of the adjacent transverse slot 77 through the longitudinal slot 76 and stops at the forward end of the other transverse slot 77, Figures 12 to 15 inclusive. When the piston 71 travelled forwardly, tubular connecting link 46 and associated elements turned the crank 40 forwardly to lower the rear end of the frame 10 and link 47 turned crank 50 forwardly to lower the forward end of the frame 10. The plow disks will now be lowered and throw the furrows in the direction of the arrow Figure 14, as the plow is driven to the left in the direction of the arrows. When the end of the row to the left is reached, fluid pressure is exhausted from the rear end of the cylinder 69 and introduced into the forward end of this cylinder, and the piston will now shift the pivot element 78, to the rear end of the adjacent transverse slot, Figure 16, without turning the plate 75 upon its pivot and the frame will be elevated and the plow disks moved out of engagement with the ground. Further pressure is introduced into the forward end of the cylinder 69 and the pivot element 78 being at the rear end of the slot 77, will turn the plate 75 upon its pivot, and the tool bar 60 will be shifted clock-wise, Figure 18, while the plow disks are still elevated above the ground. The entire machine is now turned around so that it faces to the right as also indicated in Figures 1, 20 and 21, and the pressure is exhausted from the forward end of the cylinder 69 and introduced into the rear end of the cylinder, and the pivot element 78 will be shifted from the rear end of the adjacent transverse slot 77 and will pass through the longitudinal slot 76 and be positioned adjacent to the forward end of the other transverse slot, Figures 6 and 7, and the plow disks are again lowered into the ground, Figures 6 and 7. This completes the cycle of operation.

The pipes 80 and 81 will be equipped with a conventional valve to supply and exhaust fluid pressure to and from each end of the cylinder 69, and this valve may be arranged near the operator's seat upon the tractor. Any suitable means may be employed to regulate the pressure to and from the cylinder.

The bolt 61 is adjusted to draw the plates 26 and 27 toward each other so that these plates will have frictional engagement with the tool bar 60, and this friction engagement may be adjusted. When the tool bar 60 is turned clock-wise, Figure 1, its rear end is shifted to the left, Figure 1, and this rear end having frictional engagement with the plate 26, swings this plate clockwise to the left, Figure 1. This clockwise movement of the plate 26 shifts the inclined plate 30 clockwise. This movement of the plate 30 moves the bolt 32 clockwise, and the tilt plate 31 is pivoted upon the bolt 32. The upper end or extension 67 of the tilt plate is arranged between the bars 68 which are stationary with respect to the frame bars 11. The extension 67 has a width less than the distance between the stop bars 68. When the tilt plate 31 is swung clockwise, Figure 1, it first engages the stop bar 68 to the left and the tilt plate becomes tilted and its opposite edge will be brought into engagement with the other stop bar 68 to the right, and this will limit the tilting movement of the tilt plate. The tilt plate is now inclined and has is lower end extending to the left, Figure 5. The bearing block inclines the post 35, and the wheel 37 is inclined, Figure 5. It is thus seen that when the tool bar 60 has its forward end inclined to the right or in the direction of the arrow, Figure 1, and the furrow is being thrown to the right, the wheel 37 is inclined to the left, to offer resistance to the side movement of the plow to the left. When the tool bar is swung counter-clockwise, Figure 1, the wheel 37 will be inclined to the opposite direction, viewed from the then rear end of the plow. The slot 61′ permits of relative movement between the rear end of the tool bar 60 and the plate 26. After the tilt plate 31 has been tilted to the end of its travel, the rear end of the tool bar may then move with relation to the plate 26.

It is to be understood that the form of my invention herewith shown and described is to be taken as a preferred example of the same and that various changes in the shape, size, and arrangement of parts may be resorted to without departing from the spirit of my invention or the scope of the subjoined claims.

I claim:

1. A plow comprising, a frame, wheel means, means interconnecting the wheel means and frame and operable for raising and lowering the frame with respect to the wheel means, a cylinder pivotally mounted upon the frame to swing generally horizontally, a piston within the cylinder, a substantially vertical shaft mounted upon the frame, a tool bar mounted upon the substantially vertical shaft to be swung thereby, a shifting plate secured to the shaft to turn it, said shifting plate having a main slot and end slots leading into the ends of the main slot and extending transversely of the main slot, a reciprocatory device connected with the piston to be moved thereby and including an element operating within the main slot and the end slots of the shifting plate, and means connecting the reciprocatory device and the interconnecting means so that the interconnecting means is operated by the reciprocatory device.

2. A plow comprising, a frame, wheel means, means interconnecting the wheel means and frame and operable for raising and lowering the frame with respect to the wheel means, a substantially vertical shaft mounted upon the frame to turn with relation thereto, a substantially horizontal bar mounted upon the substantially vertical shaft to be angularly adjusted thereby, blades carried by the bar to engage the ground, a cylinder mounted upon the frame, a piston within the cylinder, a reciprocatory device connected with the piston, means connecting the reciprocatory device and the interconnecting means so that the interconnecting means is operated by the reciprocatory device, a shifting plate mounted upon the substantially vertical shaft to turn the same and having a main slot extending generally transversely of said bar and end slots leading into the ends of the main slot and extending generally longitudinally of the bar, and an operating element secured to the reciprocatory device and operating within the main slot and end slots, the end slots having a sufficient length so that the frame and bar may be raised sufficiently to cause the blades to substantially disengage the ground before the substantially vertical shaft is turned to swing the bar.

3. A plow comprising, a frame, forward adjustable means connected with the frame for raising and lowering the same, rear adjustable means connected with the frame for raising and lowering the same, a tool bar pivotally mounted upon the frame to swing substantially horizontally with relation thereto, a shifting plate connected with the tool bar to swing the same, said plate having a main slot and end slots leading into the main slot near the ends of the main slot and extending transversely of the main slot, a reciprocatory device mounted upon the frame and including a part to operate within the main slot and the end slots, a link connected with the reciprocatory device and connected with the forward adjustable means to operate the forward adjustable means, a link connected with the reciprocatory device and connected with the rear adjustable means to operate the rear adjustable means, and fluid pressure operated means mounted upon the frame and connected with the reciprocatory device to operate such device.

4. A plow comprising, a frame, adjustable means connected with the frame for supporting the frame and raising and lowering the same, a tool bar angularly adjustably mounted upon the frame, a plate connected with the tool bar to angularly adjust the same and having a main slot and end slots leading into the main slot near its ends, a reciprocatory device associated with the frame and including a part to operate within the main slot and end slots, means interconnecting the reciprocatory device and the adjustable supporting means to operate the adjustable supporting means for raising and lowering the frame, and pressure operated means mounted upon the frame and connected with the reciprocatory device to operate the same.

5. A plow comprising, a frame, first wheel means associated with the frame, said wheel means having an axis of rotation, means operable for raising and lowering the frame relative to said wheel means, a tool bar pivotally mounted upon the frame, means connected with the tool bar to swing the tool bar upon its pivot, means operated by the movement of the tool bar to tilt the wheel means upon its axis of rotation, second wheel means associated with the frame, second means interconnecting the second wheel means and the frame and operable for raising and lowering the frame, and power operated means mounted upon the frame and connected with the first raising and lowering means and the second interconnecting means and the tool bar swinging means to operate the same.

6. A plow comprising, a frame, a supporting unit pivotally mounted upon the frame to swing horizontally, a tool bar pivotally mounted upon the frame to swing horizontally and swing the supporting unit upon its pivot, means connected with the tool bar to swing the tool bar upon its pivot, a tilt plate pivotally mounted upon the supporting unit to swing generally vertically, means secured to the frame and limiting the movement of the tilt plate, wheel means associated with the frame and having an axis of rotation, means interconnecting the wheel means and tilt plate so that the tilt plate may tilt the wheel means upon its axis of rotation, the interconnecting means being operable to raise and lower the frame, power operated means mounted upon the frame and connected with the interconnecting means to operate the same, and supporting means other than the wheels means connected with the frame for supporting the same.

7. A plow comprising, a frame, a supporting unit pivotally mounted upon the frame to swing horizontally, a tool bar pivotally mounted upon the frame to swing horizontally, means connecting the tool bar with the supporting unit so that the tool bar may swing the supporting unit upon its pivot, operating means connected with the tool bar to swing the tool bar upon its pivot, a tilt plate pivotally mounted upon the supporting unit to swing generally vertically, stop means secured to the frame and spaced from the pivot of the tilt plate and engaging the tilt plate, a bearing mounted upon the tilt plate, a normally inclined post having an upper generally horizontal shaft mounted in the bearing, a generally horizontal axle carried by the lower end of the inclined post, wheel means mounted upon the generally horizontal axle, pressure operated means mounted upon the frame and connected with the generally horizontal shaft of said post and said operating means, and supporting means other than the wheel means and connected with the frame for supporting the same.

8. A plow comprising a frame to be drawn by a tractor, wheel means separate from the wheels of the tractor, means interconnecting the wheel means and the frame and operable for raising and lowering the frame, a rigid member, means to support the rigid member so that it may be swung laterally, operating means to reciprocate the rigid member in a longitudinal direction, a reciprocatory device operated by the operating means and connected with the interconnecting means, a tool bar pivotally mounted upon the frame to turn about a substantially vertical axis, lost motion means connecting the tool bar and rigid member, said lost motion means comprising a transverse member to swing the tool bar about its pivot and provided near its ends with engaging parts, said lost motion means comprising coacting shifting means mounted solely upon the rigid member for engaging said engaging parts, said lost motion means including a face normally inclined to the longitudinal direction of travel of the rigid member to shift the rigid member laterally with respect to the frame and longitudinally of the transverse member, the arrangement being such that the coacting shifting means is positively moved from one position adjacent to one engaging part to the end of its travel adjacent to the other engaging part by the inclined face when the rigid member is moved longitudinally, the lateral shifting of the rigid member being effected without the aid of spring means.

References Cited in the file of this patent

UNITED STATES PATENTS

| | | |
|---|---|---|
| 724,415 | Wiegard | Mar. 31, 1903 |
| 2,163,832 | Coviello | June 27, 1939 |
| 2,552,097 | Kaltoft | May 8, 1951 |

FOREIGN PATENTS

| | | |
|---|---|---|
| 178,786 | Great Britain | Apr. 27, 1922 |
| 615,061 | Great Britain | Dec. 31, 1948 |